(12) United States Patent
Ataman

(10) Patent No.: US 10,131,420 B2
(45) Date of Patent: Nov. 20, 2018

(54) CONTROL SYSTEM COMPRISING A CONTROL ROD

(71) Applicant: MESSIER-BUGATTI-DOWTY, Velizy Villacoublay (FR)

(72) Inventor: Gary Ataman, Whitby (CA)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 269 days.

(21) Appl. No.: 15/012,339

(22) Filed: Feb. 1, 2016

(65) Prior Publication Data

US 2016/0221665 A1 Aug. 4, 2016

(30) Foreign Application Priority Data

Feb. 2, 2015 (FR) ...................... 15 50799

(51) Int. Cl.
| | | |
|---|---|---|
| *F01B 31/12* | (2006.01) | |
| *B64C 25/22* | (2006.01) | |
| *F15B 15/28* | (2006.01) | |
| *F16H 21/04* | (2006.01) | |
| *F16H 21/44* | (2006.01) | |
| *F16H 51/00* | (2006.01) | |
| *F16J 15/18* | (2006.01) | |

(Continued)

(52) U.S. Cl.
CPC .......... *B64C 25/22* (2013.01); *F15B 15/2807* (2013.01); *F15B 15/2815* (2013.01); *F16H 21/04* (2013.01); *F16H 21/44* (2013.01); *F16H 51/00* (2013.01); *F16J 15/187* (2013.01); *F16J 15/50* (2013.01); *F16J 15/525* (2013.01)

(58) Field of Classification Search
CPC .. F15B 15/2807; F15B 15/2815; F16H 21/04; F16H 21/44; B64C 25/22
See application file for complete search history.

(56) References Cited

U.S. PATENT DOCUMENTS 3,047,682 A * 7/1962 Hults ............... H01H 15/102
74/511 R
3,787,149 A * 1/1974 Dane ............... F04B 53/1087
417/554

(Continued)

FOREIGN PATENT DOCUMENTS

| CA | 2 576 801 A1 | 3/2006 |
|---|---|---|
| DE | 2 313 215 A1 | 6/1974 |

(Continued)

OTHER PUBLICATIONS

French Search Report issued in FR 1550799 dated Dec. 7, 2015.

*Primary Examiner* — Michael Leslie
(74) *Attorney, Agent, or Firm* — Sughrue Mion, PLLC

(57) ABSTRACT

Control system (1) comprising a control rod (5) extending between a first zone (2) situated in a hydraulic chamber delimited by a chamber wall (3) and a second zone (4) situated outside the hydraulic chamber. The control system (1) further comprising a seal (6) arranged around and against this control rod (5) to oppose the passage of fluid between the first and second zones (2, 4). The system further comprises a guide piece (7) assembled removably with respect to the chamber wall (3), the seal (6) is assembled inside the guide piece (7) so as to allow relative movement of the rod (5) with respect to the guide piece (7) while at the same time achieving sealing between the first and second zones (2, 4).

13 Claims, 2 Drawing Sheets

(51) Int. Cl.
*F16J 15/50* (2006.01)
*F16J 15/52* (2006.01)

(56) References Cited

U.S. PATENT DOCUMENTS 4,679,452 A * 7/1987 Stoll ................... F15B 15/2815
   92/5 R
5,201,639 A * 4/1993 Reineck .................... F04B 9/14
   417/236

FOREIGN PATENT DOCUMENTS

| | | |
|---|---|---|
| FR | 2 546 242 A1 | 11/1984 |
| JP | 63-243509 A | 10/1988 |
| WO | 2011/046351 A2 | 4/2011 |

* cited by examiner

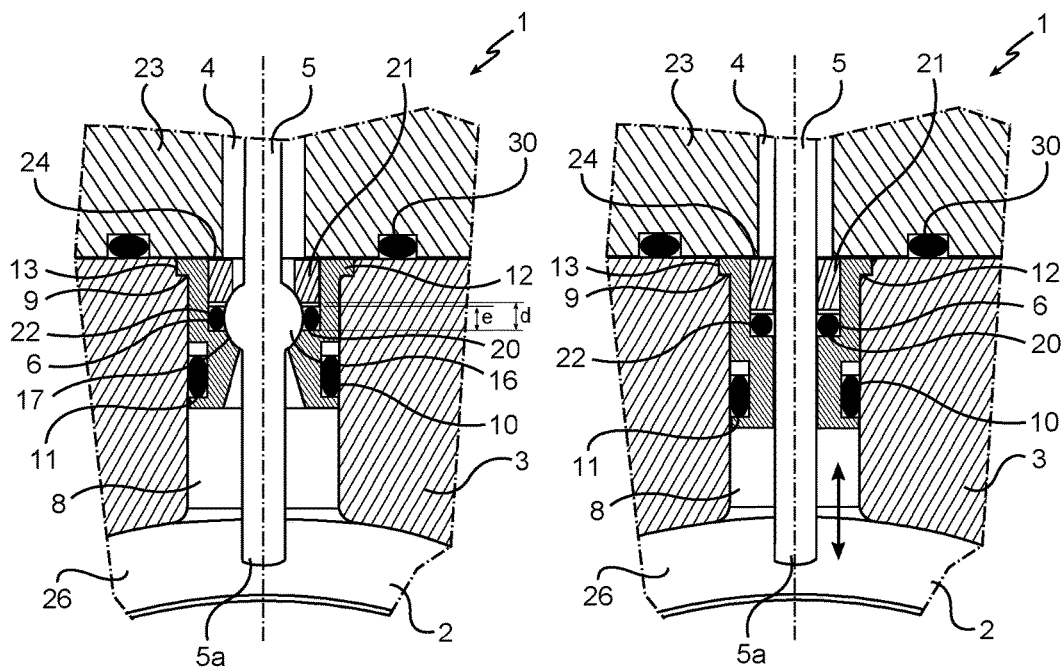
Fig. 3                    Fig. 4
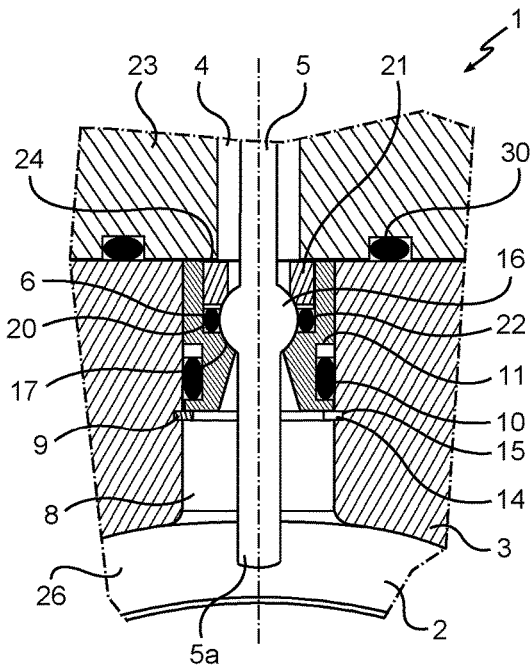
Fig. 5

CONTROL SYSTEM COMPRISING A CONTROL ROD

The invention relates to the general field of control systems extending between:
- a first zone situated in a hydraulic chamber delimited by a chamber wall; and
- a second zone situated outside the said hydraulic chamber and comprising a control rod extending between these zones in order to transmit a force from one zone to the other.

BACKGROUND OF THE INVENTION

Such a system requires sealing to be achieved between the first and second zones and all around the control rod.

This sealing is expensive to achieve and likely to become degraded over time notably as a result of the wear caused by the repeated movements of the control rod.

OBJECT OF THE INVENTION

One object of the invention is to provide a control system in which the sealing around the control rod, between the first zone inside the hydraulic chamber and the second zone outside the hydraulic chamber can be maintained easily.

SUMMARY OF THE INVENTION

To this end, the invention proposes a control system comprising a control rod extending between:
- a first zone situated in a hydraulic chamber delimited by a chamber wall; and
- a second zone situated outside the said hydraulic chamber.

This control system further comprises sealing means arranged around and against this control rod to oppose the passage of fluid between the first and second zones.

The system according to the invention is essentially characterized in that it further comprises a guide piece assembled removably with respect to the chamber wall, the sealing means being assembled inside the guide piece so as to allow relative movement of the rod with respect to the guide piece while at the same time achieving sealing between the said first and second zones.

The invention offers several advantages such as:
1 minimizing the cost of manufacture of the assembly;
2 siting the friction surface that is subjected to wear on a component that is inexpensive and removable from the assembly, in this instance the guide piece, rather than on the expensive hydraulic component in which is formed the hydraulic chamber containing the first zone;
3 minimizing the scrapping of high-cost components by positioning the machined friction zones on the removable and low-cost guide piece rather than on the fixed and high-cost hydraulic component.

For preference, the chamber wall of the control system according to the invention has passing through it a bore extending between the said first and second zones, the guide piece being placed at least partially inside this bore and coming into axial abutment against first axial-abutment means that oppose the movement of the guide piece towards the first zone, and this bore is configured to allow the guide piece to be extracted from this bore.

This embodiment allows the guide piece to be extracted, from outside the hydraulic chamber, in order for example to carry out seal maintenance. The guide piece can be removed for renovation/treatment in order to improve the peripheral sealing of the control rod.

In another aspect, the invention may also relate to an aircraft landing gear actuator essentially characterized in that it comprises a control system according to any one of the embodiments of the invention. This landing gear actuator comprises:
- a hydraulic piston mounted for sliding inside the first zone,
- a first part of the control rod which extends in the first zone so as to be able to be moved therein by the said piston,
- a second part of the control rod which extends in the second zone situated outside the said hydraulic chamber,
- a metal component is placed in this second zone so that it can be moved therein by the control rod according to the position of sliding of the said hydraulic piston,
- means for detecting the movement of the metal component in the second zone.

By virtue of the invention, the function of dynamic sealing around the mobile control rod is performed reliably and at low cost by transferring it away from the hydraulic component that defines the hydraulic chamber to the guide piece which is inexpensive and easy to replace. Thus, the control system makes it possible, at lower cost, to detect a position of sliding of the hydraulic piston in the high-pressure first zone. According to the position of sliding of the hydraulic piston in the high-pressure first zone, the control rod moves the metal component located in the medium-pressure second zone.

BRIEF DESCRIPTION OF THE DRAWINGS

Other features and advantages of the invention will become clearly apparent from the description that is given hereinafter by way of entirely nonlimiting indication with reference to the attached drawings in which:

FIG. 3 illustrates one particular embodiment of the assembly between the guide piece and the chamber wall; here the axial stop between the guide piece employs a counterbore of the bore and a flange formed on this guide piece, this flange being of a shape that complements the counterbore;

FIG. 4 illustrates the same assembly between the guide piece and the hydraulic chamber wall as in FIG. 3 but here the guide piece is not a guide piece guiding rotation with a ball pivot but a guide piece guiding the translational movement of the rod;

FIG. 5 illustrates another mode of assembly between the guide piece and the wall of the hydraulic chamber; here a groove is formed in the bore and an elastic ring introduced into the groove forms an axial stop for the guide piece inserted into the bore.

DETAILED DESCRIPTION OF THE INVENTION

Figure 1:
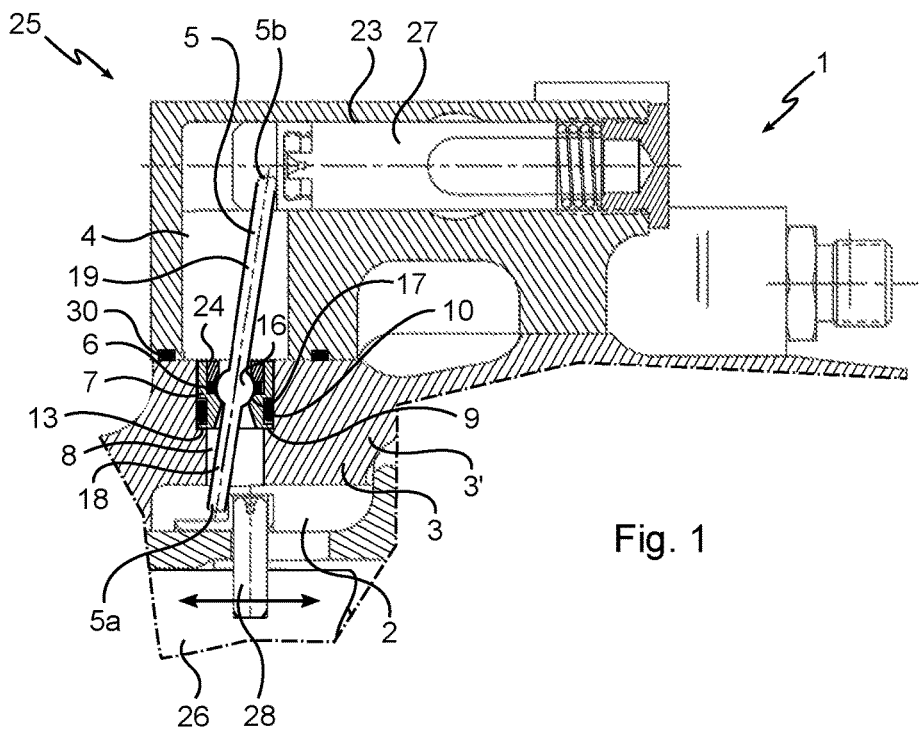
FIG. 1 depicts a view in longitudinal section of a portion of an aircraft landing gear actuator equipped with the control system according to the invention.

As indicated previously, the invention relates to a control system 1 comprising a control rod 5 extending between:

a first zone 2 situated in a hydraulic chamber delimited by a chamber wall 3; and a second zone 4 situated outside the hydraulic chamber.

A passage 8, in this instance a bore 8, is formed through the chamber wall 3 and extends between the first and second zones 2, 4. A guide piece 7 is positioned inside this passage 8 and is assembled removably with respect to the chamber wall 3. The control rod 5 passes through the passage 8 passing through this guide piece which is hollowed at its centre. A first end 5a of the rod 5 is placed in the first zone 2 and a second end 5b of the rod is placed in the second zone 4. Sealing means 6, in this instance at least one o-ring 22, are arranged around and against the control rod 5 to oppose the passage of fluid, along the rod 5, between the first and second zones 2, 4. These sealing means 6 are assembled inside the guide piece 7 and configured to allow a relative movement of the rod 5 with respect to the guide piece 7 while at the same time achieving sealing in the guide piece, along the rod 5, between the said first and second zones 2, 4.

The first zone 2 is intended to receive a fluid at high hydraulic pressure, and the second zone 4 is intended to receive a fluid at a lower hydraulic pressure relative to the said high pressure.

The movement of the control rod 5 with respect to the wall of the hydraulic chamber 3 is guided via the guide piece 7 inserted in the bore 8 of the wall 3. The sealing means 6 which are inside this guide piece 7 are removable with respect to this piece which is itself removable with respect to the wall 3.

The fact that guidance and sealing against the control rod 5 are performed in an insert, in this instance inside the guide piece 7, means that these functions can be sited in a single component 7 which is small in size relative to the size of the hydraulic component 3'.

Thus, when defective guidance or sealing around the control rod 5 is observed, there is no need to replace the hydraulic component 3', just to extract the guide piece 7 and renovate it or replace it with a new guide piece 7 and/or renovate or replace the sealing means 6.

The invention makes it possible to simplify the manufacture and maintenance of the control system 2. It also makes it possible to reduce wear and the risk of damaging the hydraulic component 3' containing the high-pressure chamber during maintenance operations.

Typically, the control system 1 according to the invention is incorporated into an aircraft landing gear actuator 25 and the hydraulic component 3', the wall 3 of which delimits the hydraulic chamber, is a solid part of the actuator. Sealing 6 can be recreated around the rod while keeping the component 3' assembled with the rest of the landing gear. In this way, landing gear downtime and the need to scrap the hydraulic component 3' are limited.

As may be seen in FIG. 1, this actuator 25 comprises a hydraulic piston 26 slidably mounted inside the first zone 2 of the hydraulic chamber. A first part of the control rod 5 extends in this first zone 2 to be moved either directly or indirectly by the said piston 26 as it moves.

In this particular example, a portion of the piston bears an index 28 which moves with the piston 26 during at least some of its axial movements in the first zone 2. This index 28 is arranged in such a way as to come into contact with the control rod 5 in order to move it with respect to the guide piece 7 and thus bring about an action in the second zone 4, outside the chamber. A metal component 27 is arranged in this second zone 4 where it can be moved by a part of the control rod 5 which is in this second zone 4, according to the position of sliding of the hydraulic piston 26.

The actuator 25 comprises means of detecting the movement of the metal component 27 in this second zone 4. These detection means are arranged away from the high-pressure first zone and may comprise an electronic sensor of the magnetic and/or capacitive sensor type that detects the proximity of the metal component 27 to the sensor.

Thus, the control system 1 allows the movement of the metal component 27 outside the chamber to be controlled from inside the chamber. Detecting the movement of the metal component 27 makes it possible to detect a position of sliding of the hydraulic piston 26 in the chamber.

Various embodiments of the assembly between the guide piece 7 and the wall 3 will now be described. Each of these embodiments may be applied both in the case where the movement/guidance of the rod involves a pivoting movement, as in the examples of FIGS. 1, 2, 3, 5 and in the case where the movement/guidance of the rod is a linear translational movement along a longitudinal axis of the rod, as in FIG. 4.

In all these assemblies of the component 7 in the bore 8, it is found that:

the guide piece 7 is in axial abutment against the first axial-stop means 9 that oppose the movement of the piece 7 towards the first zone 2;

that the bore 8 is configured to allow the guide piece 7 to be extracted from the bore 8 by a sliding of the guide piece 7 in the direction of the second zone 4; and that the guide piece 7 is in axial abutment against the second axial-stop means 24 that prevent this piece 7 from being extracted from the bore 8, these second stop means 24 being removable.

In each of the examples of assembly between the guide piece 7 and the wall 3, it is found that the guide piece 7 is a piece exhibiting symmetry of revolution extending along an axis of revolution that coincides with the main axis of the bore 8 into which this guide piece 7 is inserted/pressed.

Figure 2:
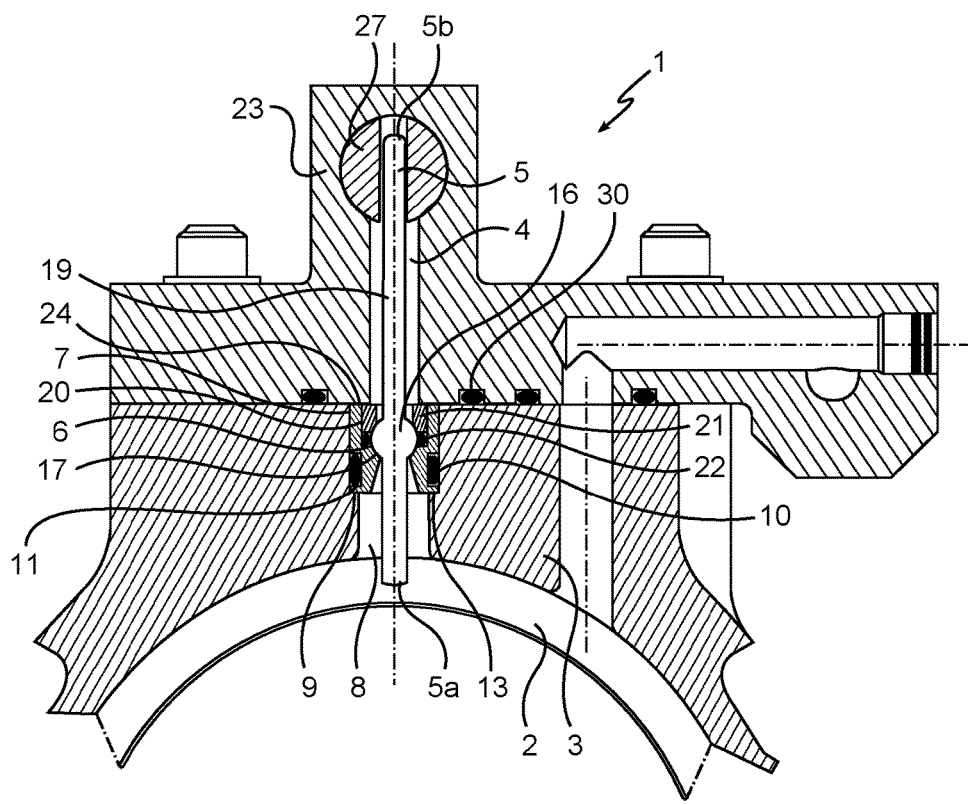
FIG. 2 illustrates a view in cross section of the actuator of FIG. 1 with a guide piece guiding the rotation of the control rod, this guide piece being inserted removably in a bore passing through a hydraulic chamber wall.

In the examples of FIGS. 1 and 2, the first axial-stop means 8 are produced by a counterbore 13 formed in the bore 8 and extending along the entire guide piece 7. The axial end of the guide piece that faces towards/is on the same side as the first zone 2 presses axially against the bottom of this counterbore 13.

In the examples of FIGS. 3 and 4, the guide piece 7 has an external annular shoulder 12 situated near that one of its ends that is oriented towards the second zone 4. Here, the counterbore 13 extends along just a portion of the piece 7 and is formed at the end of the bore 8 that is oriented towards/positioned on the same side as the second zone 4. The external annular shoulder 12 presses axially against this counterbore 13.

In the example of FIG. 5, the first axial-stop means 9 comprise an elastic ring 14 extending in an annular groove 14 formed at the internal periphery of the bore 8. This ring is arranged between the guide piece 7 and the first zone 2 and opposes the movement of the guide piece 7 towards the first zone 2.

In each of the examples of FIGS. 1 to 5, a hollow external unit 23 is arranged in such a way as to define the said second zone 4 on the outside of the chamber. This second zone 4 is formed predominantly inside the hollow external unit 23. This hollow external unit 23 is assembled removably against the said chamber wall 3 and on the outside of this chamber 3. Part of this hollow external unit 23 extends facing the bore 8 so as to form the second axial-stop means 24 that prevent the guide piece 7 from being extracted from the bore 8.

At least one annular seal 30 of the bore 8 is placed between the wall 3 and a face of the hollow external unit 23 so as to create, all around the end of the bore 8, sealing between the wall 3 and this hollow external unit 23. This seal 30 prevents the passage of fluid between the second zone 4 and the outside of the system according to the invention.

The sealing between the first and second zones 2, 4 is also achieved:
- on the outside of the guide piece 7, using a seal 10 extending all around this guide piece 7 between this guide piece 7 and an internal surface of the bore 8. In the example of FIGS. 1 to 5, this seal 10 is an annular seal, preferably an o-ring, extending in an external annular groove 11 formed in and all around this guide piece 7; and
- on the inside of the guide piece 7 using sealing means 6 arranged inside the guide piece 7, around and against the control rod 5 to oppose the passage of fluid between the first and second zones 2, 4. These sealing means 6 preferably comprise an o-ring 22 in contact with the rod and with an internal annular surface of the guide piece. In the embodiments of FIGS. 1 to 3 and 5 in which the rod comprises a ball pivot, this seal 22 is in contact with the ball pivot and allows the rod to pivot while at the same time ensuring sealing.

In each of the embodiments of FIGS. 1 to 3 and 5, the control rod 5 has a ball pivot 16 formed between terminal ends 5a, 5b of this control rod 5. The guide piece 7 comprises a ball pivot seat 17 formed inside the guide piece 7 and against which the ball pivot 16 is positioned in order to allow the control rod 5 to pivot about a central point of the ball pivot and with respect to the ball pivot seat 17 which forms an annular support for the ball pivot 16.

The ball pivot 16 has an annular surface forming a portion of a sphere and the rod 5 comprises a first portion 18 extending from the ball pivot 16 as far as the first zone 2, which it enters, and a second portion 19 extending from the ball pivot 16 as far as the second zone 4, which it enters.

The first portion 18 is designed to control the pivoting of the ball pivot 16 with respect to the ball pivot seat 17, and therefore the movement of the second portion 19 in the second zone, from the first zone 2. This causes the metal component 27 to move by sliding in this second zone.

The guide piece 7 has a counterbore 20 formed between the ball pivot seat 17 and the second zone 4. An annular retaining ring 21 is arranged inside this counterbore 20 in order to wedge the ball pivot 16 between the ball pivot seat 17 and this annular retaining ring 21.

It is noted that the o-ring 22 is positioned between the ring 21 and the ball pivot seat 17. This o-ring 22 which surrounds the ball pivot is in radical contact with the ball pivot 16 and with a planar internal annular surface of the counterbore produced in the guide piece.

This o-ring 22 has a thickness e smaller than a distance d formed axially between a planar internal annular surface of the counterbore 20 and the annular retaining ring 21. Thus, this o-ring 22 is clamped radially between the ball pivot 16 and the guide piece 7 while still being able to move axially between the planar internal annular surface of the counterbore 20 and the annular retaining ring 21. That allows the o-ring to adapt slightly to any potential defects in the shape of the ball pivot. The accuracy of the machining can thus be minimized.

Ideally, that part of the hollow external unit 23 that extends opposite the bore 8 also sits opposite the annular retaining ring 21 in order to prevent the extraction of the annular retaining ring 21 with respect to the counterbore 20 made in the guide piece 7.

The assembling of the control system 1 is simplified because all that is required:
- is for the guide piece 7 to be slid in the bore 8 passing through the chamber wall 3 until this piece 7 is resting against the first axial-stop means 9; then
- for the external unit 23 to be positioned on the outside of the chamber wall so that it clamps both the guide piece 7 and the annular retaining ring 21 between the chamber wall 3 and this external unit 23.

This assembly requires very few operations and guarantees:
- via the o-ring 22, sealing between the guide piece 7 and the control rod 5;
- via the o-ring 10, sealing between the guide piece 7 and the chamber wall 3;

while at the same time allowing the control rod 5 to move in a sealed manner with respect to the chamber wall 3.

Moreover, in the event of wearing of the rod 5 or of the seals 10, 22 or of the sliding surfaces where the ball pivot 16 and the ball pivot seat 17 slide on one another, these pieces 5, 7, 10, 22 can simply be replaced without the need to modify or to scrap the hydraulic component 3 that forms the hydraulic chamber.

The invention may also relate to a method of renovating an aircraft landing gear actuator as defined hereinabove. This method involves a step of creating the said bore 8 in an already-existing passage in the chamber wall 3 and a step of inserting the said rod-guiding piece 7 in this bore so that the control rod extends between the first and second zones 2 and 4. Once this guide piece 7 is wedged between the first and second axial-stop means 24, the rod can then be guided while at the same time adhering to the need for sealing between the zones 2 and 4.

This method allows the sealing between the first and second zones 2, 4 to be renovated at lower cost. The scrapping of the hydraulic component 3' can be avoided and the life of the landing gear can thus be extended, at low cost.

The invention claimed is:
1. A control system (1) comprising:
a chamber wall (3) delimiting a hydraulic chamber;
a control rod (5) extending between:
  a first zone (2) situated in said hydraulic chamber delimited by said chamber wall (3); and
  a second zone (4) situated outside said hydraulic chamber;
a hollow external unit (23) assembled removably against said chamber wall (3) and on the outside of said chamber wall (3), said second zone (4) being formed inside the hollow external unit (23);
sealing means (6) arranged around and against this control rod (5) to oppose the passage of fluid between the first and second zones (2, 4);
a guide piece (7) assembled removably with respect to the chamber wall (3), the sealing means (6) being assembled inside the guide piece (7) so as to allow relative movement of the rod (5) with respect to the guide piece (7) while at the same time achieving sealing between the said first and second zones (2, 4); and
a bore (8) passing through the chamber wall (3) and extending between the first and second zones (2, 4), the guide piece (7) being placed inside said bore (8) and coming into axial abutment against first axial- abutment means (9) that oppose the movement of the guide piece (7) towards the first zone (2),
wherein said bore (8) is configured to allow the guide piece (7) to be extracted from said bore (8), by a sliding of the guide piece (7) in the direction of the second zone (4), and
wherein part of the hollow external unit (23) extends facing the bore (8) so as to form a second axial-stop (24) arranged to prevent the guide piece (7) from being extracted from the bore (8).

2. The control system according to claim 1, in which a seal (10) extends around the guide piece (7), between this guide piece (7) and an internal surface of the bore (8).

3. The control system according to claim 1, in which the guide piece (7) has an external annular shoulder (12), the first axial-abutment means (9) which oppose the movement of the guide piece (7) towards the first zone (2) comprise a counterbore (13) formed at an end of the bore (8) of the chamber wall (3) that is positioned on the same side as the second zone (4), the external annular shoulder (12) bearing axially against this counterbore (13) of the chamber wall (3).

4. The control system according to claim 1, in which the first axial-abutment means (9) comprise an elastic ring (14) extending in an annular groove (15) formed at the periphery of the bore (8) passing through the chamber wall (3), between the guide piece (7) and the first zone (2).

5. The control system according to claim 1, in which the control rod (5) has a ball pivot (16) formed between terminal ends (5a, 5b) of this control rod (5), and the guide piece (7) comprises a ball pivot seat (17) formed inside the guide piece (7) and against which the ball pivot (16) is positioned to allow the control rod (5) to pivot about a central point of the ball pivot and with respect to the ball pivot seat (17) which forms an annular support for the ball pivot (16).

6. The control system according to claim 5, in which the ball pivot (16) has an annular surface forming a portion of a sphere and the rod (5) comprises a first portion (18) extending from the ball pivot (16) as far as the first zone (2) and a second portion (19) extending from the ball pivot (16) as far as the second zone (4), the first portion (18) being configured to control, from the first zone (2), the pivoting of the ball pivot (16) with respect to the ball pivot seat (17).

7. The control system according to claim 6, in which the guide piece (7) has a counterbore (20) formed between the ball pivot seat (17) and the second zone (4), an annular retaining ring (21) is arranged inside this counterbore (20) in order to wedge the ball pivot (16) between the ball pivot seat (17) and this annular retaining ring (21).

8. The control system according to claim 7, in which the sealing means (6) arranged around and against the control rod (5) to oppose the passage of fluid between the first and second zones (2, 4) comprise an o-ring (22) surrounding the ball pivot and coming into radial contact with the ball pivot and with a planar internal annular surface of the counterbore made in the guide piece.

9. The control system according to claim 8, in which the o-ring (22) has a thickness (e) smaller than a distance (d) formed axially between a planar internal annular surface of the counterbore (20) and the annular retaining ring (21) so that this o-ring (22) is clamped radially between the ball pivot (16) and the guide piece (7) and can move axially between the planar internal annular surface of the counterbore (20) and the annular retaining ring (21).

10. An aircraft landing gear actuator (25), comprising:
a control system (1) according to claim 1,
a hydraulic piston (26) mounted for sliding inside the first zone (2), a first part of the control rod extending in the first zone (2) so as to be able to be moved by the said piston (26), a second part of the control rod extending in the second zone (4) situated outside the said hydraulic chamber,
a metal component (27) being placed in this second zone (4) so that it can be moved therein by the control rod (5) according to the position of sliding of the said hydraulic piston (26),
the actuator (25) further comprising means for detecting the movement of the metal component (27) in the second zone (4).

11. The control system according to claim 6, wherein said part of the hollow external unit (23) that extends facing the bore (8) also sits opposite the annular retaining ring (21) in order to prevent the extraction of the annular retaining ring (21) with respect to the counterbore (20) made in the guide piece (7).

12. A control system (1) comprising:
a control rod (5) extending between:
a first zone (2) situated in a hydraulic chamber delimited by a chamber wall (3); and
a second zone (4) situated outside the said hydraulic chamber;
a sealing means (6) arranged around and against this control rod (5) to oppose the passage of fluid between the first and second zones (2, 4); and
a guide piece (7) assembled removably with respect to the chamber wall (3),
wherein the sealing means (6) is assembled inside the guide piece (7) so as to allow relative movement of the rod (5) with respect to the guide piece (7) while at the same time achieving sealing between the first and second zones (2, 4),
wherein the control rod (5) has a ball pivot (16) formed between terminal ends (5a, 5b) of the control rod (5), and the guide piece (7) comprises a ball pivot seat (17) formed inside the guide piece (7) and against which the ball pivot (16) is positioned to allow the control rod (5) to pivot about a central point of the ball pivot and with respect to the ball pivot seat (17) which forms an annular support for the ball pivot (16),
wherein the ball pivot (16) has an annular surface forming a portion of a sphere and the rod (5) comprises a first portion (18) extending from the ball pivot (16) as far as the first zone (2) and a second portion (19) extending from the ball pivot (16) as far as the second zone (4), the first portion (18) being configured to control, from the first zone (2), the pivoting of the ball pivot (16) with respect to the ball pivot seat (17),
wherein the guide piece (7) has a counterbore (20) formed between the ball pivot seat (17) and the second zone (4), an annular retaining ring (21) is arranged inside this counterbore (20) in order to wedge the ball pivot (16) between the ball pivot seat (17) and said annular retaining ring (21), and
wherein the sealing means (6) arranged around and against the control rod (5) to oppose the passage of fluid between the first and second zones (2, 4) comprises an o-ring (22) surrounding the ball pivot and coming into radial contact with the ball pivot and with a planar internal annular surface of the counterbore made in the guide piece.

13. The control system according to claim 12, in which the o-ring (22) has a thickness (e) smaller than a distance (d) formed axially between a planar internal annular surface of the counterbore (20) and the annular retaining ring (21) so that this o-ring (22) is clamped radially between the ball pivot (16) and the guide piece (7) and can move axially between the planar internal annular surface of the counterbore (20) and the annular retaining ring (21).

\* \* \* \* \*